US012519148B2

(12) United States Patent
Hou (10) Patent No.: US 12,519,148 B2
(45) Date of Patent: Jan. 6, 2026

(54) BATTERY MODULE, BATTERY PACK, AND VEHICLE (71) Applicant: CONTEMPORARY AMPEREX TECHNOLOGY (HONG KONG) LIMITED, Hong Kong (CN)

(72) Inventor: Yujia Hou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 564 days.

(21) Appl. No.: 17/563,500

(22) Filed: Dec. 28, 2021

(65) Prior Publication Data
US 2022/0123381 A1 Apr. 21, 2022

Related U.S. Application Data (63) Continuation of application No. PCT/CN2020/120323, filed on Oct. 12, 2020.

(30) Foreign Application Priority Data

Nov. 25, 2019 (CN) .......................... 201922050479.0

(51) Int. Cl.
*H01M 10/625* (2014.01)
*H01M 10/42* (2006.01)
(Continued)

(52) U.S. Cl.
CPC ....... *H01M 10/486* (2013.01); *H01M 10/425* (2013.01); *H01M 10/625* (2015.04);
(Continued)

(58) Field of Classification Search
CPC ............ H01M 10/486; H01M 10/625; H01M 10/653; H01M 10/425; H01M 50/249;
(Continued)

(56) References Cited

U.S. PATENT DOCUMENTS

| 2017/0244139 A1* | 8/2017 | Tononishi | ............ H01G 9/0029 |
| 2019/0027731 A1* | 1/2019 | Zeng | ..................... H01M 50/51 |
| 2019/0088918 A1* | 3/2019 | Goh | .................... H01M 50/519 |

FOREIGN PATENT DOCUMENTS

| CN | 1870342 A | 11/2006 |
| CN | 205192650 U | 4/2016 |

(Continued)

OTHER PUBLICATIONS

International Search Report issued on Dec. 30, 2020, in corresponding International Application PCT/CN2020/120323; 4 pages (with English Translation).

(Continued)

*Primary Examiner* — Osei K Amponsah
(74) *Attorney, Agent, or Firm* — K&L Gates LLP (57) ABSTRACT Embodiments relate to the technical field of batteries, and provide a battery module, a battery pack, and a vehicle to optimize a structure of the battery module. The battery module includes a battery, a harness plate, a circuit board, a compression element, and a temperature collection assembly. The battery includes a top cover. The harness plate is disposed on a top outer side of the top cover. The compression element is connected above the harness plate. The temperature collection assembly includes a thermistor. The thermistor is electrically connected to the circuit board, and the thermistor is disposed between the top cover and the compression element. The compression element presses the thermistor so that the thermistor is pressed against the top cover. The battery module provided in the foregoing solution shortens a temperature collection path and makes measurement accurate.

20 Claims, 6 Drawing Sheets (51) Int. Cl.
  *H01M 10/48*  (2006.01)
  *H01M 10/653* (2014.01)
  *H01M 50/204* (2021.01)
  *H01M 50/249* (2021.01)
  *H01M 50/271* (2021.01)
  *H01M 50/289* (2021.01)

(52) U.S. Cl.
  CPC ....... *H01M 10/653* (2015.04); *H01M 50/204* (2021.01); *H01M 50/249* (2021.01); *H01M 50/271* (2021.01); *H01M 50/289* (2021.01); *H01M 2010/4271* (2013.01); *H01M 2220/20* (2013.01)

(58) Field of Classification Search
  CPC ............. H01M 50/289; H01M 50/204; H01M 50/271; H01M 2010/4271; H01M 2220/20
  See application file for complete search history.

(56) References Cited

FOREIGN PATENT DOCUMENTS

| | | |
|---|---|---|
| CN | 209200108 U | 8/2019 |
| CN | 210628444 U | 5/2020 |
| EP | 2648931 B1 | 2/2017 |
| KR | 101872833 B1 | 6/2018 |
| WO | 02082617 A1 | 10/2002 |
| WO | 2018080033 A1 | 5/2018 |
| WO | 2019073857 A1 | 4/2019 |
| WO | 2019088789 A1 | 5/2019 |

OTHER PUBLICATIONS

Extended European Search Report issued on May 20, 2022, in connection with corresponding European Application No. 20891945.6; 6 pages.

\* cited by examiner

BATTERY MODULE, BATTERY PACK, AND VEHICLE

CROSS-REFERENCE TO RELATED APPLICATIONS

This application is a continuation of International Application No. PCT/CN2020/120323, filed on Oct. 12, 2020, which claims priority to Chinese Patent Application No. 201922050479.0, filed on Nov. 25, 2019 and entitled "BATTERY MODULE, BATTERY PACK, AND VEHICLE", and both of the aforementioned applications are incorporated herein by reference in their entireties.

TECHNICAL FIELD

This application relates to the technical field of batteries, and in particular, to a battery module, a battery pack, and a vehicle.

BACKGROUND

A normal operating temperature of a battery module is within a range of –30° C.~55° C. If this temperature range is exceeded, the battery module will limit a discharge power to implement safety protection of the battery module.

In the related art, the battery module collects temperatures in the following way: collecting a temperature on a connecting plate by using a thermistor disposed on a flexible circuit board, and using the temperature of the connecting plate as an internal temperature of a battery. In actual situations, the temperature on the connecting plate is relatively high but the internal temperature of the battery is relatively low. If a difference between the two temperatures is large, the battery module will prematurely limit the power, consequently affecting efficacy of the battery module.

Currently, vehicle manufacturers in the industry are inclined to develop coupe-type cars, and electric vehicles modified from traditional models also need to reflect rapid-acceleration advantages and characteristics of electric vehicles. Therefore, demand for rapid-acceleration conditions will become more common, and requirements on the power of the battery module will be higher.

SUMMARY

This application discloses a battery module, a battery pack, and a vehicle.

This application discloses a battery module, including: a battery including a top cover; a harness plate disposed on a top outer side of the top cover; a circuit board; a compression element connected above the harness plate; and a temperature collection assembly, including a thermistor. The thermistor is electrically connected to the circuit board, and the thermistor is disposed between the top cover and the compression element. The compression element presses the thermistor so that the thermistor is pressed against the top cover.

In the battery module disclosed above, the thermistor of the temperature collection assembly is mounted on the compression element of the harness plate and is pressed to abut the top cover of the battery, so that a temperature collected by the thermistor is the temperature of the top cover. The temperature of the top cover is relatively consistent with an internal temperature of the battery. The top cover can reflect a change and a value of the internal temperature of the battery in time. The temperature of the top cover rises in parallel to a rise of the internal temperature of the battery, and the temperature of the top cover decreases in parallel to a decrease of the internal temperature of the battery. The temperature of the top cover changes in parallel to the change of the internal temperature of the battery. The temperature collection assembly transmits a collected temperature value to a component such as the circuit board for subsequent analysis, processing, and judgment. As can be seen from the temperature transfer path, when collecting the internal temperature of the battery, the battery module uses the top cover of the battery as a start point for collecting the temperature. The entire path of temperature collection and transfer is short, and a temperature response speed is high. This also enables more accurate control in subsequent processing based on the collected temperature, and effectively reduces or even avoids occurrence of circumstances that the battery module prematurely limits the power. Therefore, efficacy of the battery module is exerted efficiently, and the structure and performance of the battery module are effectively optimized.

In some embodiments, an avoidance structure is disposed on the harness plate. The thermistor runs through the avoidance structure and is pressed against the top cover. With this arrangement, the thermistor runs through the avoidance structure and is pressed to abut the top cover, and the structure is simple and reliable.

In some embodiments, the avoidance structure is a via hole disposed on the harness board. With this arrangement, the avoidance structure is simple and conveniently manufacturable.

In some embodiments, the temperature collection assembly further includes a thermal pad disposed between the thermistor and the top cover. The thermal pad is highly thermally conductive and elastic. The thermal pad implements a reliable contact between the thermal pad and the top cover, and between the thermal pad and the thermistor, so that the thermistor can accurately collect the temperature on the top cover of the battery.

In some embodiments, the thermistor is electrically connected to the circuit board through a conducting wire, and the compression element presses the thermal pad against the top cover through the thermistor. The conducting wire can implement electrical connection between the thermistor and the circuit board, so that the temperature of the top cover can be collected based on a change of a resistance of the thermistor.

In some embodiments, the thermistor is fixed to the circuit board to implement electrical connection between the thermistor and the circuit board. The compression element presses the thermal pad against the top cover through the thermistor. With this arrangement, the thermistor can be electrically connected to the circuit board, and the temperature of the top cover can be collected based on the change of the resistance of the thermistor.

In some embodiments, a mounting slot is disposed on the compression element, and the thermistor is disposed in the mounting slot. The disposed mounting slot can define a position of the thermistor in a circumferential direction, and can exert a pressing force on the thermistor. In this way, the thermistor will not shift after being reliably mounted, thereby avoiding interference with a temperature collection operation.

In some embodiments, the battery module further includes an elastic pad located between a bottom of the mounting slot and the thermistor. The arrangement of the elastic pad not only presses the thermistor tightly, but also enables the thermistor to change its size to some extent in a Z direction, thereby enabling the thermistor to reliably collect the temperature of the top cover.

In some embodiments, the circuit board includes a substrate board and a cantilever connected to the substrate board, and the thermistor is mounted at a free end of the cantilever. The thermistor can swing up and down freely for a distance along with the cantilever. Therefore, the thermistor can reliably abut the top cover as pressed by the compression element, and is not likely to snap off.

In some embodiments, the substrate board is disposed between the harness plate and the compression element. A run-through hole is disposed on the substrate board. The cantilever is disposed in the run-through hole. A connecting end of the cantilever is connected to an inner wall of the run-through hole. A gap exists between the free end of the cantilever and the inner wall of the run-through hole. With this arrangement, the cantilever can be disposed on the substrate board, and a manufacturing process is simple and convenient.

In some embodiments, a first connecting portion and a second connecting portion are disposed on the harness plate. The compression element includes a first connecting end and a second connecting end. The first connecting end is rotatably connected to the first connecting portion, and the second connecting end is fixedly connected to the second connecting portion. The compression element is rotatably connected to the first connecting portion of the harness plate through the first connecting end. By means of this connection, the compression element can still rotate against the harness plate after the compression element is reliably connected to the harness plate, thereby facilitating mounting of components such as the thermistor. The compression element is snap-fitted to the second connecting portion of the harness plate through the second connecting end. Therefore, after the second connecting end is reliably mounted to the second connecting portion, the compression element is fully fixed to the harness plate without any relative movement between the compression element and the harness plate. In this way, the position of the thermistor pressed by the compression element is defined, the thermistor can collect temperatures normally, and the temperature collection component of the battery module can work normally.

In some embodiments, the first connecting portion includes a bulge facing the compression element. A connecting hole is disposed on the bulge. The first connecting end includes a pivoting portion, and the pivoting portion is rotatably mounted in the connecting hole. In this way, the first connecting portion can be rotatably connected to the first connecting end, and the structure is simple and reliable.

In some embodiments, an open slot is disposed on a hole wall of the connecting hole, so that the pivoting portion is rotatably mounted in the connecting hole through the open slot. In this way, the pivoting portion and the connecting hole can be assembled conveniently and quickly.

In some embodiments, an opening direction of the open slot is away from the top cover. With this arrangement, the pivoting portion can be inserted into the connecting hole from top to bottom, and the mounting of the pivoting portion is more convenient and more operable.

In some embodiments, there are two pivoting portions, and central axes of the two pivoting portions are collinear. The connecting holes are disposed in one-to-one correspondence to the pivoting portions. With this arrangement, the rotatable connection between the pivoting portion and the connecting hole is more reliable, and the rotation is more poised.

In some embodiments, the second connecting portion includes a snap-fit portion, and the snap-fit portion is snap-fitted to the second connecting end. The snap-fit connection manner facilitates disassembly and assembly, and makes connection reliable.

In some embodiments, the second connecting end includes a recessed portion. The snap-fit portion is snap-fitted to the recessed portion. With this arrangement, the second connecting end can be snap-fitted to the snap-fit portion, and the snap-fit structure is reliable.

Other embodiments of this application provide a battery pack, including the battery module provided in any technical solution of this application.

The battery pack provided in this application collects the temperature of the top cover, so that the entire path of temperature collection and transfer is short, and a temperature response speed is high. This enables more accurate control in subsequent processing based on the collected temperature, and effectively reduces or even avoids occurrence of circumstances that the battery module prematurely limits the power. Therefore, efficacy of the battery module is exerted efficiently, and the structure and performance of the battery module are effectively optimized.

Another embodiment of this application provides a vehicle. The vehicle includes: a power source that provides power to the vehicle; and a battery pack according to any technical solution of this application. The battery pack is configured to provide electrical power to the power source.

The battery pack of the vehicle provided in this application collects the temperature of the top cover, so that the entire path of temperature collection and transfer is short, and a temperature response speed is high. This enables more accurate control in subsequent processing based on the collected temperature, and effectively reduces or even avoids occurrence of circumstances that the battery module prematurely limits the power. Therefore, efficacy of the battery module is exerted efficiently, and the structure and performance of the battery module are effectively optimized. Further, the performance of the vehicle that adopts the battery pack is optimized, and reliability of the vehicle is increased.

BRIEF DESCRIPTION OF DRAWINGS

To describe the technical solutions in the embodiments of this application more clearly, the following outlines the drawings used in the embodiments of this application. Apparently, the drawings outlined below are merely a part of embodiments of this application. A person of ordinary skill in the art may derive other drawings from the outlined drawings without making any creative efforts.

The drawings are not drawn to actual scale.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

The inventor of this application finds that, in some circumstances, at least the following problems exist: due to limitations of space and size inside the battery module, in view of manufacturability and cost, a width and a thickness of a connecting plate cannot be very large. Under relatively low working conditions, such as a discharging at a 1C current, a temperature of the connecting plate is close to an internal temperature of a battery. However, when the battery is discharged at a higher current rate, the temperature of the connecting plate is much higher than the internal temperature of the battery. Under high-power working conditions, due to limitations of a passage area of the connecting plate, the temperature of the connecting plate rises sharply, but the internal temperature of the battery rises slowly. A temperature difference between the connecting plate and the internal temperature of the battery is huge, consequently causing the battery module to prematurely limit power, and thereby affecting a discharge power of the battery module. Therefore, how to detect the internal temperature of the battery is an urgent technical problem to be solved in the industry.

Technical solutions provided in this application are described in more detail below with reference to FIG. 1 to FIG. 8.

Figure 1:
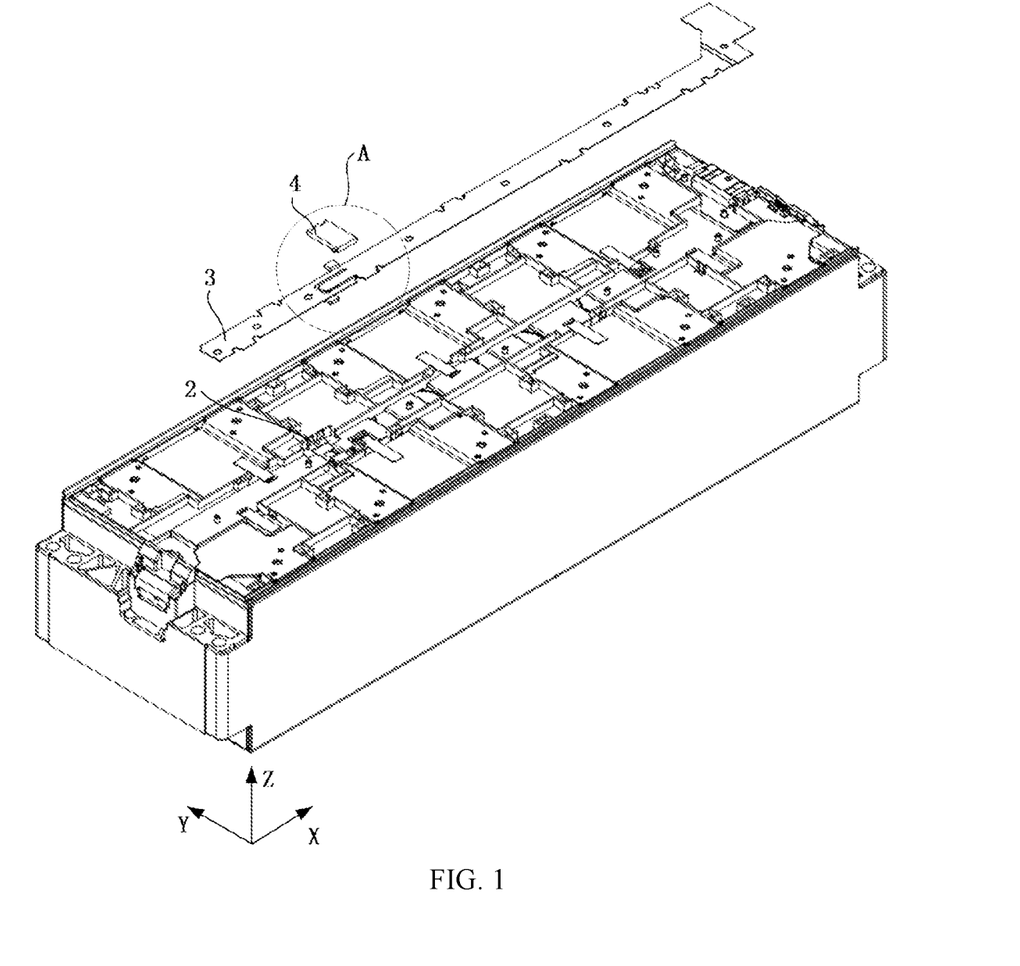
FIG. 1 is a schematic diagram of a three-dimensional structure of a battery module according to an embodiment of this application.
Figure 2:
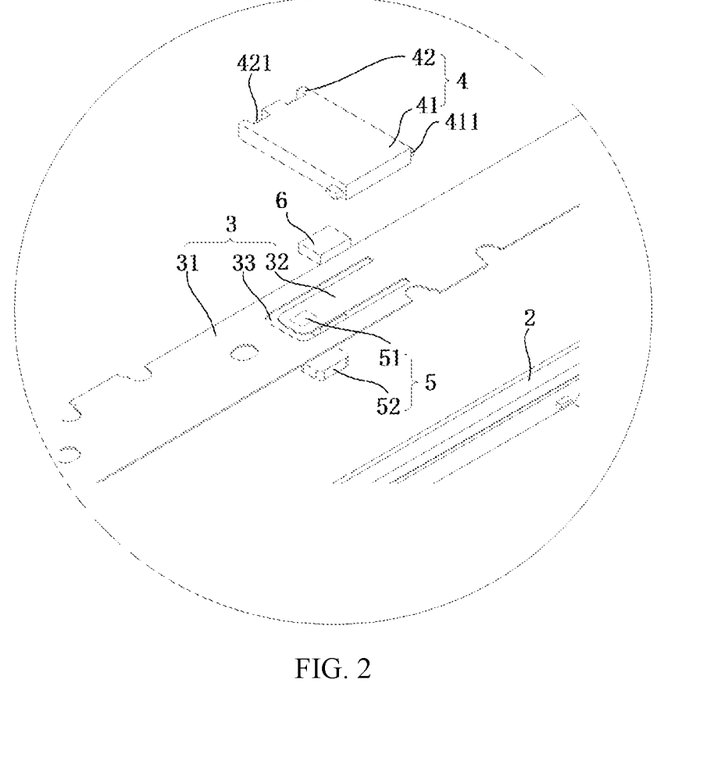
FIG. 2 is a local detailed view of a position A shown in FIG. 1.
Figure 3:
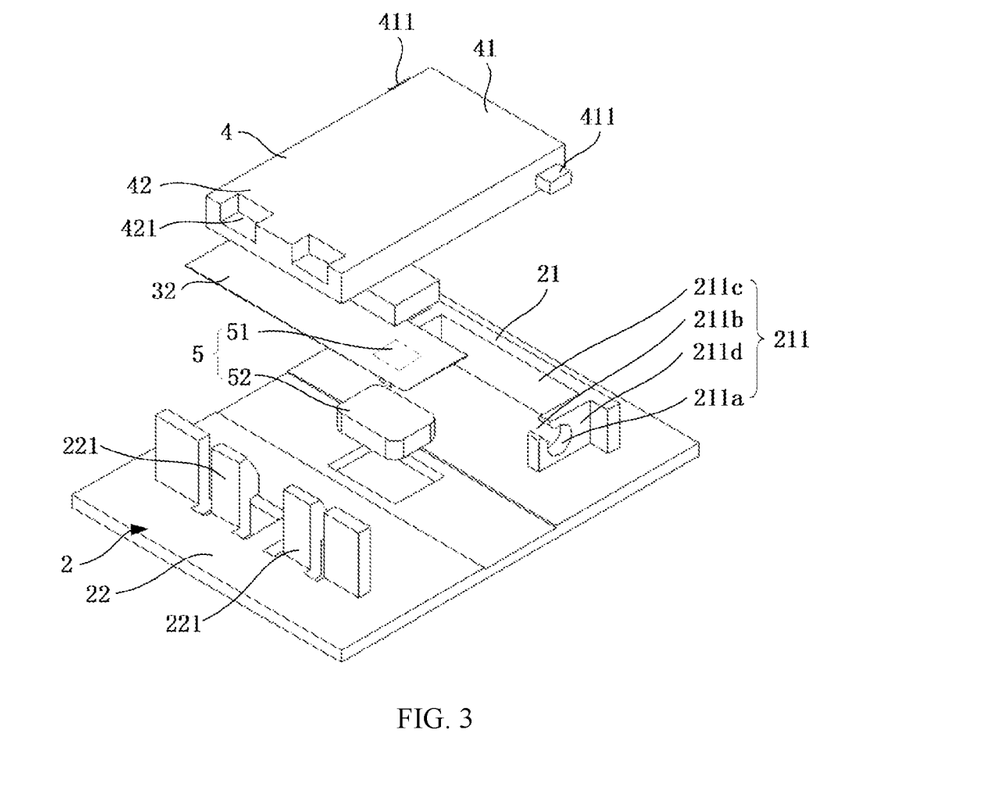
FIG. 3 is a schematic exploded view of a thermistor in a battery module according to an embodiment of this application.

Referring to FIG. 1 to FIG. 8, an embodiment of this application provides a battery module, including a battery 1, a harness plate 2, a circuit board 3, a compression element 4, and a temperature collection assembly 5. The battery 1 includes a top cover 11. The harness plate 2 is disposed on a top outer side of the top cover 11, and a first connecting portion 21 and a second connecting portion 22 are disposed on the harness plate 2. The circuit board 3 is disposed on a side of the harness plate 2 away from the battery 1. Referring to FIG. 2 and FIG. 3, the compression element 4 includes a first connecting end 41 and a second connecting end 42. The first connecting end 41 is rotatably connected to the first connecting portion 21. The second connecting end 42 is fixedly connected to the second connecting portion 22, for example, by snap-fitting. The temperature collection assembly 5 includes a thermistor 51. The thermistor 51 is electrically connected to the circuit board 3. The compression element 4 presses the thermistor 51 so that the thermistor 51 is pressed against the top cover 11.

The following describes in detail a structure of each part and connection relationships between the parts.

Figure 6:
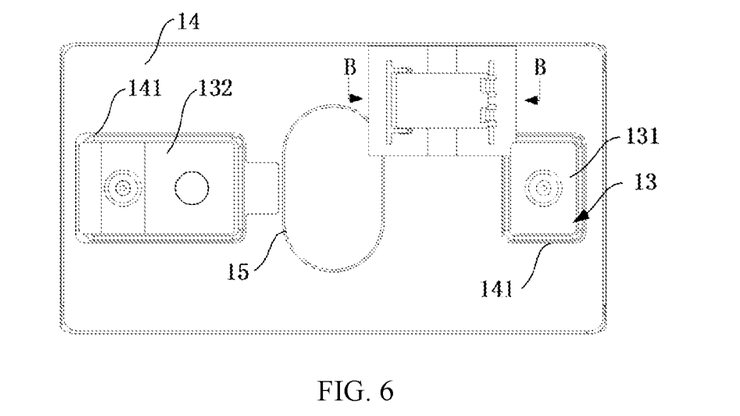
FIG. 6 is a schematic top view of a battery in a battery module according to an embodiment of this application.
Figure 7:
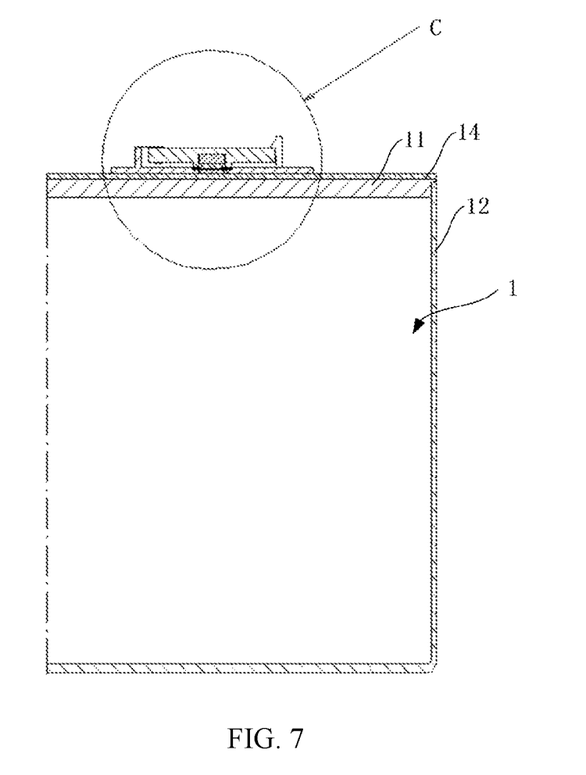
FIG. 7 is a local cross-sectional view taken along a B-B section line shown in FIG. 6.

In some embodiments, referring to FIG. 6 and FIG. 7, FIG. 6 is a schematic top view of one of batteries 1 in a battery module, and FIG. 7 is a schematic cross-sectional view taken along a B-B section line shown in FIG. 6. The structure of the battery 1 is as follows: the battery 1 includes a housing 12, an electrode assembly (not shown in the drawing) disposed inside the housing 12, a top cover 11 disposed on a top of the electrode assembly, an electrode terminal 13 disposed on the top cover 11, and a top sheet 14 disposed on a top of the top cover 11. Specifically, the top sheet 14 is affixed to the top of the top cover 11. The top cover 11 is fixedly welded to the housing 12. An explosion-proof valve 15 is further disposed on the top cover 11. An explosion-proof hole is made on the top sheet 14 so that the explosion-proof valve is exposed out of the explosion-proof hole. Two electrode terminal via holes 141 are made on the top sheet 14. The electrode terminal 13 is mounted in each electrode terminal via hole 141. As shown in FIG. 6, the electrode terminal 13 includes a positive electrode terminal 131 and a negative electrode terminal 132.

Referring to FIG. 6, the top sheet 14 is made of a material such as an insulation material. The top sheet 14 is sheet-shaped, and fits snugly with a top surface of the top cover 11 in size. For example, the structure and size of the top sheet 14 just fully overlay the top surface of the top cover 11. Alternatively, the size of the top sheet 14 is slightly larger than the size of the top surface of the top cover 11, so that the top sheet 14 has a sufficient size to form a flap to wrap the top cover 11, and to implement reliable connection between the top sheet 14 and the top cover 11.

On the one hand, the top sheet 14 serves an insulative function to prevent a short circuit between the top cover 11 and an external line. On the other hand, the top sheet 14 serves to protect the top cover 11 and prevent the top cover 11 from being scratched.

Depending on a manufacturing type of the electrode assembly, the battery 1 is classed into a stacked battery and a jelly-roll battery. The stacked battery is formed in the following way: cutting a positive electrode plate, separator, and a negative electrode plate into specified sizes, and then stacking the positive electrode plate, the separator, and the negative electrode plate into a battery. The jelly-roll battery is formed by winding the positive electrode plate, the negative electrode plate, and the separator.

Referring to FIG. 6, in order to collect a surface temperature of the top cover 11, an opening is made on the top sheet 14 to expose a part of the top cover 11 as a temperature sampling position.

Referring to FIG. 6, the opening is, for example, made at any position of the top sheet 14. However, the temperature of the entire surface of the top cover 11 is not completely consistent. Considering convenience of mounting the temperature collection assembly 5 and accuracy of collected temperatures, the opening K is disposed adjacent to the negative electrode terminal 132, for example. The temperature at a point near the negative electrode terminal 132 on the top cover 11 of the battery 1 is closer to a true temperature inside the battery 1. A difference between the two temperatures under severe working conditions is within 5° C. that is acceptable. The temperature collection assembly 5 is mounted at the opening, so that the temperature collected by the temperature collection assembly 5 is also scarcely different from the internal temperature of the battery 1, and that the temperature collected by the temperature collection assembly 5 more accurately reflects the internal temperature of the battery 1. Further, as a result, when the circuit board 3 subsequently performs analysis and processing based on temperature data collected by the temperature collection assembly 5, the obtained data is more accurate, and the control is more precise, thereby effectively reducing occurrence of phenomena that the battery module prematurely limits the discharge power.

Referring to FIG. 1 and FIG. 2, in some embodiments, the circuit board 3 is a flexible printed circuit board 3 (Flexible Printed Circuit Board, FPC for short) or a printed circuit board 3 (Printed Circuit Board, PCB for short), for example. The PCB is of high rigidity and high hardness relatively, and the FPC is of high flexibility and low hardness relatively.

Referring to FIG. 1 to FIG. 2, the circuit board 3 is, for example, long-strip-shaped, and the circuit board 3 is located in a middle region of the harness plate 2.

The following describes a connection relationship between the compression element 4 and the harness plate 2.

Referring to FIG. 1 to FIG. 3, implementations of the first connecting portion 21 of the harness plate 2 and the first connecting end 41 of the compression element 4 are described first.

Referring to 1 to FIG. 3, the first connecting portion 21 includes a bulge 211 facing the compression element 4. A connecting hole 211a is disposed on the bulge 211. A protrusion direction of the bulge 211 is away from the top cover 11 of the battery 1. The first connecting end 41 includes a pivoting portion 411. The pivoting portion 411 is rotatably mounted in the connecting hole 211a.

The pivoting portion 411 is a cylindrical structure or other columnar structure, for example. The pivoting portion 411 is in a shaft-hole fitting relationship with the connecting hole 211a like a relationship between a pivot shaft and a hole. The pivoting portion 411 can freely rotate in the connecting hole 211a.

Referring to FIG. 3, the bulge 211 includes a long-strip-shaped body portion 211c and a bent portion 211d disposed at both ends of the body portion 211c. A connecting hole 211a is formed on each bent portion 211d. Specifically, the bent portion 211d is also a strip-shaped structure, and the connecting hole 211a is formed at an end of the bent portion 211d.

An angle by which the pivoting portion 411 can rotate freely in the connecting hole 211a is not affected by a fitting gap between the pivoting portion 411 and the connecting hole 211a, but the angle of free rotation is not necessarily 360°. In a mounting process, the compression element 4 can rotate by a specific angle against the harness plate 2, for example, by 0-110°. This angle may be any degrees as long as an elastic pad 6, a thermistor 51, and a thermal pad 52 to be mentioned later can be conveniently mounted.

Referring to FIG. 3, in order to enable the pivoting portion 411 to be conveniently mounted into the connecting hole 211a, an open slot 211b is disposed on a hole wall of the connecting hole 211a. The open slot 211b is disposed at the end of the bent portion 211d, that is, at a position near an intersection between two edges. Referring to FIG. 3, one of top corners of the bent portion 211d is vacant, and the vacancy is the open slot 211b. The pivoting portion 411 can be conveniently mounted into the connecting hole 211a through the open slot 211b.

Referring to FIG. 2, an opening direction of the open slot 211b is away from the top cover 11. That is, the opening direction of the open slot 211b faces the compression element 4. The opening direction of the open slot 211b is so disposed that the pivoting portion 411 can be inserted into the connecting hole 211a from top to bottom, and the mounting of the pivoting portion 411 is more convenient and more operable.

Figure 4:
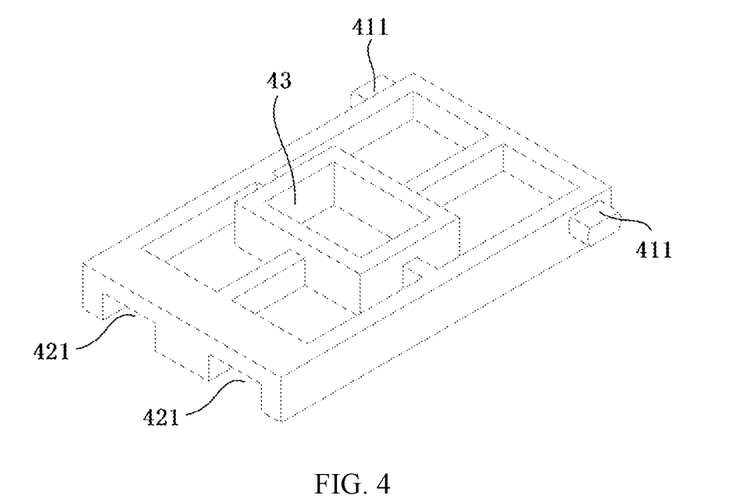
FIG. 4 is a schematic structural diagram of a compression element of a battery module according to an embodiment of this application.

Referring to FIG. 4, in some embodiments, in order to adjust the angle of the compression element 4 against the harness plate 2 more smoothly in the mounting process so that the elastic pad 6, the thermistor 51, and the thermal pad 52 are easier to mount, there are two pivoting portions 411, and central axes of the two pivoting portions 411 are collinear. The connecting holes 211a are disposed in one-to-one correspondence to the pivoting portions 411. There are two connecting holes 211a too. A pivoting portion 411 is mounted in each connecting hole 211a.

In the foregoing technical solution, the first connecting portion 21 is rotatably connected to the first connecting end 41. The rotatable connection makes it easier to mount the elastic pad 6, the thermistor 51, and the thermal pad 52. After the elastic pad 6, the thermistor 51, and the thermal pad 52 are reliably mounted, the second connecting end 42 of the compression element 4 is fixedly connected to the second connecting portion 22 of the harness plate 2. In this way, a fixed connection is formed between the compression element 4 and the harness plate 2, and the thermistor 51 of the temperature collection assembly 5 is firmly mounted at a desired position to implement stable collection of temperatures.

Referring to FIG. 2 to FIG. 4, implementations of the second connecting portion 22 of the harness plate 2 and the second connecting end 42 of the compression element 4 are described below.

Referring to FIG. 3 and FIG. 4, the second connecting portion 22 includes a snap-fit portion 221. The snap-fit portion 221 is snap-fitted to the second connecting end 42. The snap-fit connection manner facilitates disassembly and assembly, and makes connection reliable.

The first connecting portion 21 is disposed opposite to the second connecting portion 22. The first connecting end 41 is disposed opposite to the second connecting end 42.

The second connecting end 42 includes a recessed portion 421. The snap-fit portion 221 is snap-fitted to the recessed portion 421. Specifically, the second connecting portion 22 includes a snap-fit portion 221 facing the compression element 4, and the second connecting end 42 includes a recessed portion 421. The snap-fit portion 221 is snap-fitted to the recessed portion 421.

As can be seen from FIG. 2 to FIG. 4, the compression element 4 is roughly a rectangular flat plate, and its first connecting end 41 and second connecting end 42 are two ends of the rectangular flat plate respectively. The recessed portion 421 is disposed at the second connecting end 42 of the compression element 4, and is configured to limit the rotatable connection formed by the first connecting end 41 of the compression element 4. In this way, after both ends of the compression element 4 are reliably mounted, the position of the compression element 4 relative to the harness plate 2 is definite.

Figure 5:
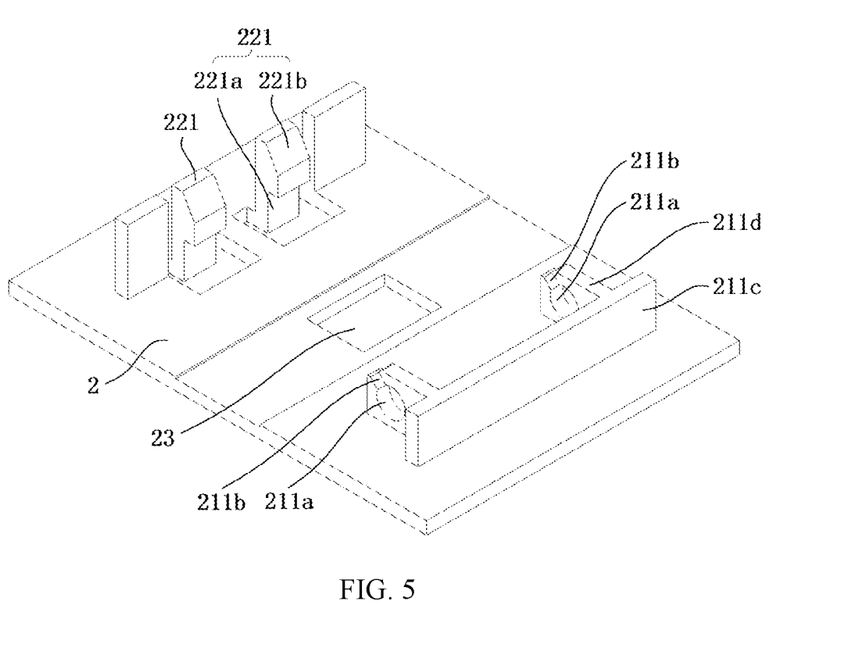
FIG. 5 is a schematic diagram of a local structure of a harness plate of a battery module according to an embodiment of this application.

Referring to FIG. 5, the snap-fit portion 221 includes a vertical plate 221a and a hook 221b disposed on the vertical plate 221a. The hook 221b faces the recessed portion 421. The mounting method is: pressing the harness plate 2 toward the top cover 11 firmly, so that the recessed portion 421 can move from above the hook 221b to below the hook 221b, whereby a lower end face of the hook 221b hooks a recessed bottom surface of the recessed portion 421 to form a snap-fit connection.

Referring to FIG. 3 to FIG. 5, in order to make the connection between the recessed portion 421 and the snap-fit portion 221 more stable and reliable, a plurality of snap-fit portions 221 and a plurality of recessed portions 421 are disposed, and the snap-fit portions 221 are disposed in one-to-one correspondence to the recessed portions 421. Because a plurality of snap-fit portions 221 and a plurality of recessed portions 421 are disposed, a plurality of contact positions are formed between the snap-fit portions and the recessed portions. Therefore, a plurality of force-receiving positions exist, and the connection between the compression element 4 and the harness plate 2 is more reliable.

An implementation of the temperature collection assembly 5 is described below.

Figure 8:
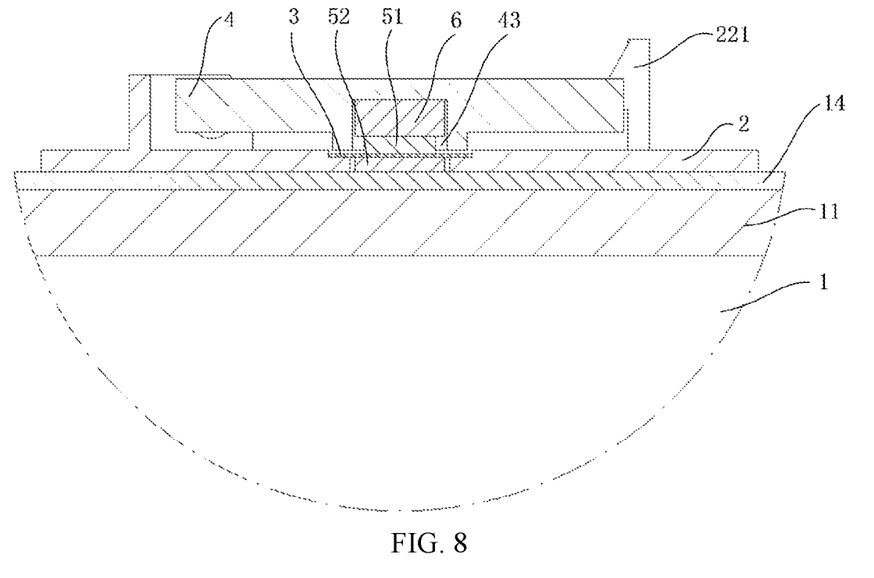
FIG. 8 is a local detailed view of a position C shown in FIG. 7.

The temperature collection assembly 5 includes a thermistor 51. The thermistor 51 is configured to implement temperature collection. Referring to FIG. 3 and FIG. 8, in order to protect the thermistor 51 from being damaged by an excessive received force and enable a heat transfer path to conduct heat normally, the temperature collection assembly 5 further includes a thermal pad 52. The thermal pad 52 is disposed between the thermistor 51 and the top cover 11.

The thermistor 51 may be an NTC (Negative Temperature Coefficient, negative temperature coefficient) surface mount device (SMD) temperature sensor, or a water drop head NTC temperature sensor.

Specifically, in some embodiments, the thermistor 51 is a water drop head NTC temperature sensor. The water drop head NTC temperature sensor includes a head and a conducting wire connected to the head. The head is water-drop-shaped, and therefore, may also be called a water drop head or an end. The head of the water drop head NTC temperature sensor and the thermal pad 52 may abut each other directly, or may be interspaced with a film structure that hardly affects temperature transfer. The thermal pad 52 is pressed by the compression element 4 to abut the top cover 11 of the battery 1. For example, the compression element 4 directly presses the thermal pad 52; or the compression element 4 presses another part so that the thermal pad 52 is pressed. The foregoing structure enables the thermistor 51 to accurately collect the temperature of the top cover 11 of the battery 1.

In other embodiments, the thermistor 51 is an NTC SMD temperature sensor. The NTC SMD temperature sensor includes a head and a conducting wire connected to the head. The head is roughly a cuboid structure. The head of the NTC SMD temperature sensor is in direct contact with the thermal pad 52 or is in indirect contact through a film structure that hardly affects temperature transfer. The thermal pad 52 is pressed by the compression element 4 to abut the top cover 11. For example, the compression element 4 directly presses the thermal pad 52; or the compression element 4 presses another part so that the thermal pad 52 is pressed. The foregoing structure enables the thermistor 51 to accurately collect the temperature of the top cover 11.

The thermal pad 52 is of relatively high thermal conductivity and high compressibility. The thermal pad 52 that has the foregoing structure not only improves heat transfer efficiency, but also can withstand squeezing caused by expansion, deformation, collision, and vibration of the battery 1 in a charge or discharge process. After the thermal pad 52 is disposed, a temperature transfer path is: the temperature of the top cover 11 is transferred to the thermal pad 52, and the temperature of the thermal pad 52 is transferred to the thermistor 51. The thermistor 51 transmits a collected temperature signal to the circuit board 3 for analysis and processing, so as to control a discharge power of the battery module.

As can be learned from the above analysis, in the technical solution described above, the temperature collected by the thermistor 51 is the temperature at the top cover 11 of the battery 1. The temperature of the top cover 11 is relatively consistent with an internal temperature of the battery 1. The top cover 11 can reflect a change and a value of the internal temperature of the battery 1 in time. In addition, the temperature transfer path is short, and a response speed of the thermistor 51 in temperature collection is high. This enables more accurate control in subsequent processing based on the collected temperature, and effectively reduces or even avoids occurrence of circumstances that the battery module prematurely limits the power. Therefore, efficacy of the battery module is exerted efficiently, and the structure and performance of the battery module are effectively optimized. Further, the performance of vehicle equipment that adopts the battery module is optimized, and reliability of the vehicle equipment is increased.

Several implementations of an electrical connection between the thermistor 51 and the circuit board 3 are described below.

Before the implementation of the electrical connection between the thermistor 51 and the circuit board 3 is described, a mechanical connection relationship between the thermistor 51 and the circuit board 3 is described first. A connection manner is that the thermistor 51 is integrated with the circuit board 3, as shown in the drawings of the embodiments. A dashed box in FIG. 2 and FIG. 3 shows a position of the thermistor 51. A thin film is disposed on an outer side of the thermistor 51. The thin film is a thin film that overlays the circuit board 3. A lateral face of the thermistor 51 on one side fits snugly with the thermal pad 52 through the thin film. A lateral face of the thermistor 51 on the other side fits snugly with the elastic pad 6 through a thin film on the other side. The thin film is very thin, and therefore, hardly affects the temperature transfer process. Another connection manner is that a run-through hole (not shown in the drawing) is made on a cantilever 32 of the circuit board 3 to run through the cantilever in a thickness direction of the cantilever. The thermistor 51 is mounted in the run-through hole. A lateral face of the thermistor 51 on one side fits directly with the thermal pad 52, and a lateral face of the thermistor 51 on the other side fits snugly with the elastic pad 6.

A first electrical connection manner between the thermistor 51 and the circuit board 3 is: the thermistor 51 is electrically connected to the circuit board 3 through a conducting wire. The thermal pad 52 is pressed by the compression element 4 to abut the top cover 11, so that the thermal pad 52 keeps fitting snugly with the top cover 11. The thermistor 51 is in contact with a side of the thermal pad 52 away from the top cover 11.

A length of the conducting wire depends on a mounting position of the thermistor 51 and a position of the electrical connection between the conducting wire and the circuit board 3. Specifically, for example, the conducting wire is electrically connected to the circuit board 3 in the following manner: a plug is electrically connected to an end of the conducting wire away from the thermistor 51, and a socket is fixedly disposed on the circuit board 3. The plug is plugged to the socket to implement the electrical connection between the conducting wire and the circuit board 3.

With the foregoing structure, relative fitting relationships between the parts are as follows: the thermal pad 52 is disposed on a top surface of the top cover 11, and the compression element 4 fixedly connected to the harness plate 2 presses the thermal pad 52. The compression element 4 has a structure that limits the position of the thermistor 51, such as a mounting slot 43 to be described later. See FIG. 4. The mounting relationship between the thermistor 51 and the mounting slot 43 will be described in detail later.

In the foregoing technical solution, the temperature collection path of the battery module is: the temperature at the top cover 11 is transferred to the thermal pad 52, then transferred to the thermistor 51, and then transferred to the circuit board 3 through the conducting wire connected to the thermistor 51, so as to complete analysis and processing of the temperature data. The foregoing temperature collection path is very short. The temperature collection of the thermistor 51 is rapid, the temperature transfer is accurate, and the temperature collected by the thermistor 51 can change in parallel to the change of the internal temperature of the battery 1.

A second electrical connection manner between the thermistor 51 and the circuit board 3 is: the thermistor 51 is fixed to the circuit board 3 to implement an electrical connection between the thermistor 51 and the circuit board 3. The thermistor 51 is electrically connected to the circuit board 3 directly without requiring any conducting wires. The compression element 4 presses the thermal pad 52 against the top cover 11 through the thermistor 51.

Referring to FIG. 2 and FIG. 3, the circuit board 3 includes a substrate board 31 and a cantilever 32 connected to the substrate board 31, and the thermistor 51 is mounted at a free end of the cantilever 32.

In some embodiments, a run through hole 33 is disposed on the substrate board 31. The cantilever 32 is disposed in the run-through hole 33. A connecting end of the cantilever 32 is connected to an inner wall of the run-through hole 33. A gap exists between the free end of the cantilever 32 and the inner wall of the run-through hole 33. The cantilever 32 and the substrate board 31 are integrated as a whole.

Referring to FIG. 2, the run-through hole 33 is disposed on the circuit board 3. The run-through hole 33 makes a part of the circuit board 3 into the cantilever 32. The thermistor 51 is mounted at a free end of the cantilever 32. When receiving no other external forces, the thermistor 51 can swing freely up and down along with the cantilever 32. In a mounting process of the thermistor 51, the thermistor 51 can swing up and down freely for a distance along with the cantilever 32. Therefore, the thermistor 51 can be mounted smoothly regardless of the position of a mounting gap between the elastic pad 6 and the thermal pad 52 in a Z direction. In some embodiments, in an operating process of the battery module, due to expansion of the battery 1, the cantilever 32 can drive the thermistor 51 to move so as to adapt to the expansion of the battery module, and to prevent the circuit board 3 or the thermistor 51 from being damaged by the expansion of the battery 1.

The second disposition manner of the thermistor 51 differs from the first disposition manner in that, in the second disposition manner, the thermistor 51 is directly fixed to the circuit board 3. A length of a solder of an electrical connection between the thermistor 51 and the circuit board 3 is almost negligible. The thermistor 51 and the circuit board 3 are equivalently a whole. Specifically, the thermistor 51 is directly welded to a bonding pad of the circuit board 3, and is electrically connected to a temperature sampling line inside the circuit board 3.

Referring to FIG. 1 and FIG. 4, a mounting slot 43 is disposed on the compression element 4, and the thermistor 51 is disposed in the mounting slot 43. The mounting slot 43 is a countersunk slot, and the mounting slot 43 does not run through a thickness direction of the compression element 4. A bottom of the mounting slot 43 exerts a pressing force on the thermistor 51. In this way, the thermistor 51 will not shift after being reliably mounted, thereby avoiding interference with a temperature collection operation.

Referring to FIG. 4, a meshed structure is disposed on a side of the compression element 4 toward the harness plate 2, and a mounting slot 43 is formed in a middle region of the compression element 4. A shape of the mounting slot 43 is identical to or different from a shape of an end of the thermistor 51, but a size of the mounting slot 43 needs to meet requirements for mounting the end of the thermistor 51, and needs to enable the end of the thermistor 51 to be fully located inside the mounting slot 43. The shape of the mounting slot 43 is, for example, a circle, a square, or another irregular shape. The mounting slot 43 protects the thermistor 51, prevents the pressing force of the compression element 4 from damaging the thermistor 51, and safeguards a temperature collection function of the thermistor 51.

Referring to FIG. 4 and FIG. 8, in order to further protect the thermistor 51, an elastic pad 6 is sandwiched between the bottom of the mounting slot 43 and the thermistor 51. After the elastic pad 6 is disposed, merely a small part of the thermistor 51 needs to be located in the mounting slot 43. As squeezed by the elastic pad 6, the thermistor 51 can still refrain from shifting or shaking in an operating process of the battery module.

Referring to FIG. 4 to FIG. 8, a depth of the mounting slot 43 is greater than a thickness of the elastic pad 6. The mounting slot 43 of the compression element 4 surrounds the elastic pad 6. The elastic pad 6 is fully located inside the mounting slot 43, thereby ensuring that a reaction force of the pressed thermal pad 52 is exerted on the elastic pad 6 through the thermistor 51. In this way, the thermistor 51 receives little force, and the thermistor 51 is prevented from malfunctioning due to the received force. On the other hand, the compression element 4 makes a surrounding region of the thermistor 51 flat and non-bent, so that a mounting surface of the thermistor 51 is flat. In this way, a contact area is large during mounting, and reliable mounting of the thermistor 51 is ensured.

For example, a position-limiting protection structure is disposed inside the mounting slot 43. In this way, after the thermistor 51 is mounted inside the mounting slot 43, the position is relatively fixed. In addition, during operation of the battery module, the thermistor 51 refrains from loosening, shifting, or the like, and the temperature collection operation of the thermistor 51 can be performed accurately.

Alternatively, the thermistor 51 may be settled in the mounting slot 43 in other ways. For example, first, the thermistor 51 and the elastic pad 6 are fixed together by an adhesive, and then the thermistor 51, the elastic pad 6, and the thermal pad 52 are mounted. Alternatively, first, the thermistor 51, the thermal pad 52, the elastic pad 6, and other parts are reliably mounted, and then the adhesive is dispensed in the mounting slot 43 to fix the thermistor 51 to the inner wall of the mounting slot 43. The adhesive bonding increases reliability of the fixed connection between the thermistor 51 and the inner wall of the mounting slot 43, implements waterproof performance of the thermistor 51, and prevents water drops from damaging the thermistor 51. In addition, because the thermistor 51 is located inside the mounting slot 43, the inner wall of the mounting slot 43 restricts a flow region of the adhesive and prevents adhesive overflow. The adhesive may be a thermally conductive adhesive.

Referring to FIG. 5, a via hole 23 is disposed on the harness plate 2. The thermal pad 52 fits snugly with the top cover 11 through the via hole 23. Specifically, one lateral face of the thermal pad 52 fits snugly with the thermistor 51 through the via hole 23. The other lateral face of the thermal pad 52 fits snugly with the top cover 11. The via hole 23 of the harness board 2 is used as an avoidance hole so that temperature collection parts can be mounted and operate normally.

The via hole 23 enables the thermal pad 52 to directly contact the top cover 11. The compression element 4 indirectly presses the thermal pad 52 by pressing the circuit board 3. In this way, the thermal pad 52 fits closely with the top cover 11 so that the thermistor 51 can accurately collect the temperature of the top cover 11.

In the foregoing technical solution, the temperature collection path of the battery module is: the temperature at the top cover 11 is transferred to the thermal pad 52, then transferred to the thermistor 51, and then transferred to the circuit board 3 directly, so as to complete analysis and processing of the temperature data. The temperature collection path is shorter, the temperature collection of the thermistor 51 is faster, and the temperature transfer is more accurate.

Other embodiments of this application provide a battery pack, including the battery module provided in any technical solution of this application.

The battery pack provided in the foregoing technical solution contains the battery module according to any technical solution of this application, and therefore, has the various structures and beneficial effects of the battery module described above.

Further, other embodiments of this application provide a vehicle, including a power source and the battery module according to any technical solution of this application. The power source provides power to the vehicle. The battery pack is configured to provide electrical power to the power source.

The vehicle provided in the foregoing technical solution contains the battery pack according to any technical solution of this application, and therefore, has the various structures and beneficial effects of the battery pack described above.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A battery module, comprising:
   a battery comprising a top cover;
   a harness plate disposed on a top outer side of the top cover;
   a circuit board;
   a compression element connected above the harness plate;
   a mounting slot;
   an elastic pad; and
   a temperature collection assembly comprising a thermistor and a thermal pad, wherein the thermistor is electrically connected to the circuit board, and the thermistor is disposed between the top cover and the compression element; and the compression element is configured to press the thermistor so that the thermistor is pressed against the top cover, the thermal pad is disposed between the thermistor and the top cover, the thermal pad is pressed by the compression element to abut the top cover and fitting snugly with the top cover,
   wherein the circuit board comprises a substrate board and a cantilever, a run-through hole is disposed on the substrate board, the cantilever is disposed in the run-through hole, a connecting end of the cantilever is connected to an inner wall of the run-through hole, and the thermistor is mounted at a free end of the cantilever, the thermistor is able to swing freely up and down along with the cantilever when receiving no other external forces;
   the mounting slot is disposed on the compression element, the mounting slot does not run through a thickness direction of the compression element, and the thermistor is disposed in the mounting slot, and the compression element is configured to press the thermal pad against the top cover through the thermistor;
   the elastic pad is located inside the mounting slot and between a bottom of the mounting slot and the thermistor, a depth of the mounting slot is greater than a thickness of the elastic pad, the elastic pad is configured to press the thermistor and enable the thermistor to change in size along the thickness direction and collect a temperature of the top cover.

2. The battery module according to claim 1, wherein an avoidance structure is disposed on the harness plate; and
   the thermistor is configured to run through the avoidance structure and is pressed against the top cover.

3. The battery module according to claim 2, wherein the avoidance structure is a via hole disposed on the harness plate, a first lateral face of the thermal pad fits snugly with the thermistor through the via hole, a second lateral face of the thermal pad fits snugly with the top cover.

4. The battery module according to claim 1, wherein the thermistor is electrically connected to the circuit board through a conducting wire.

5. The battery module according to claim 1, wherein the thermistor is fixed to the circuit board to implement electrical connection between the thermistor and the circuit board, and the compression element presses the thermal pad against the top cover through the thermistor.

6. The battery module according to claim 1, wherein the substrate board is disposed between the harness plate and the compression element, a run-through hole is disposed on the substrate board, the cantilever is disposed in the run-through hole, a connecting end of the cantilever is connected to an inner wall of the run-through hole, and a gap exists between the free end of the cantilever and the inner wall of the run-through hole.

7. The battery module according to claim 1, wherein a first connecting portion and a second connecting portion are disposed on the harness plate; and
the compression element comprises a first connecting end and a second connecting end, the first connecting end is rotatably connected to the first connecting portion, and the second connecting end is fixedly connected to the second connecting portion.

8. The battery module according to claim 7, wherein the first connecting portion comprises a bulge facing the compression element, and a connecting hole is disposed on the bulge; and the first connecting end comprises a pivoting portion, and the pivoting portion is rotatably mounted in the connecting hole.

9. The battery module according to claim 8, wherein an open slot is disposed on a hole wall of the connecting hole, so that the pivoting portion is rotatably mounted in the connecting hole through the open slot.

10. The battery module according to claim 9, wherein an opening direction of the open slot is away from the top cover.

11. The battery module according to claim 8, wherein there are two pivoting portions, and central axes of the two pivoting portions are collinear; and the connecting holes are disposed in one-to-one correspondence to the pivoting portions.

12. The battery module according to claim 7, wherein the second connecting portion comprises a snap-fit portion, and the snap-fit portion is snap-fitted to the second connecting end.

13. The battery module according to claim 12, wherein the second connecting end comprises a recessed portion, and the snap-fit portion is snap-fitted to the recessed portion.

14. A battery pack, comprising a battery module, and the battery module comprises:
a battery comprising a top cover;
a harness plate disposed on a top outer side of the top cover;
a circuit board;
a compression element connected above the harness plate;
a mounting slot;
an elastic pad; and
a temperature collection assembly comprising a thermistor and a thermal pad, wherein the thermistor is electrically connected to the circuit board, and the thermistor is disposed between the top cover and the compression element; and the compression element is configured to press the thermistor so that the thermistor is pressed against the top cover, the thermal pad is disposed between the thermistor and the top cover, the thermal pad is pressed by the compression element to abut the top cover and fitting snugly with the top cover,
wherein the circuit board comprises a substrate board and a cantilever, a run-through hole is disposed on the substrate board, the cantilever is disposed in the run-through hole, a connecting end of the cantilever is connected to an inner wall of the run-through hole, and the thermistor is mounted at a free end of the cantilever, the thermistor is able to swing freely up and down along with the cantilever when receiving no other external forces;
the mounting slot is disposed on the compression element, the mounting slot does not run through a thickness direction of the compression element, and the thermistor is disposed in the mounting slot, and the compression element is configured to press the thermal pad against the top cover through the thermistor;
the elastic pad is located inside the mounting slot and between a bottom of the mounting slot and the thermistor, a depth of the mounting slot is greater than a thickness of the elastic pad, the elastic pad is configured to press the thermistor and enable the thermistor to change in size along the thickness direction and collect a temperature of the top cover.

15. A vehicle, comprising:
a power source, wherein the power source provides power to the vehicle; and
a battery pack, wherein the battery pack is configured to provide electrical power to the power source and comprises a battery module, and the battery module comprises:
a battery comprising a top cover;
a harness plate disposed on a top outer side of the top cover;
a circuit board;
a compression element connected above the harness plate;
a mounting slot;
an elastic pad; and
a temperature collection assembly comprising a thermistor and a thermal pad, wherein the thermistor is electrically connected to the circuit board, and the thermistor is disposed between the top cover and the compression element; and the compression element is configured to press the thermistor so that the thermistor is pressed against the top cover, the thermal pad is disposed between the thermistor and the top cover, the thermal pad is pressed by the compression element to abut the top cover and fitting snugly with the top cover,
wherein the circuit board comprises a substrate board and a cantilever, a run-through hole is disposed on the substrate board, the cantilever is disposed in the run-through hole, a connecting end of the cantilever is connected to an inner wall of the run-through hole, and the thermistor is mounted at a free end of the cantilever, the thermistor is able to swing freely up and down along with the cantilever when receiving no other external forces;
the mounting slot is disposed on the compression element, the mounting slot does not run through a thickness direction of the compression element, and the thermistor is disposed in the mounting slot, and the compression element is configured to press the thermal pad against the top cover through the thermistor;
the elastic pad is located inside the mounting slot and between a bottom of the mounting slot and the thermistor, a depth of the mounting slot is greater than a thickness of the elastic pad, the elastic pad is configured to press the thermistor and enable the thermistor to change in size along the thickness direction and collect a temperature of the top cover.

16. The battery module according to claim 1, wherein the compression element is configured to make a surrounding region of the thermistor flat and non-bent, such that a mounting surface of the thermistor is flat.

17. The battery module according to claim 1, further comprising an adhesive dispensed in the mounting slot to fix the thermistor to an inner wall of the mounting slot.

18. The battery module according to claim 3, wherein the compression element indirectly presses the thermal pad by pressing the circuit board to allow the thermal pad to fit closely with the top cover, such that the thermistor can collect a temperature of the top cover.

19. The battery module according to claim 1, wherein a thin film is disposed on an outer side of the thermistor and overlays the circuit board, a lateral face of the thermistor on the outer side fits snugly with the thermal pad through the thin film.

20. The battery module according to claim 1, wherein a second run-through hole is provided on the cantilever and runs through the cantilever in a thickness direction of the cantilever, the thermistor is placed in the second run-through hole, a lateral face of the thermistor on an outer side fits directly with the thermal pad, and a lateral face of the thermistor on an inner side fits snugly with the elastic pad.

* * * * *